(12) United States Patent
Chichierchia

(10) Patent No.: US 8,881,264 B2
(45) Date of Patent: Nov. 4, 2014

(54) METHOD FOR CONTROLLING THE EXECUTION OF AN APPLET FOR AN IC CARD

(75) Inventor: Maria Chichierchia, Caiazzo (IT)

(73) Assignee: STMicroelectronics International N.V., Geneva (CH)

( * ) Notice: Subject to any disclaimer, the term of this patent is extended or adjusted under 35 U.S.C. 154(b) by 1020 days.

(21) Appl. No.: 12/122,243

(22) Filed: May 16, 2008

(65) Prior Publication Data

US 2008/0288699 A1 Nov. 20, 2008

(30) Foreign Application Priority Data

May 17, 2007 (IT) .................................. MI07A0996

(51) Int. Cl.

| G06F 13/00 | (2006.01) |
|---|---|
| G06F 21/73 | (2013.01) |
| G06F 21/51 | (2013.01) |
| G06F 21/77 | (2013.01) |
| G06F 21/74 | (2013.01) |
| G06F 21/12 | (2013.01) |
| G06F 21/55 | (2013.01) |

(52) U.S. Cl.
CPC ................ *G06F 21/74* (2013.01); *G06F 21/73* (2013.01); *G06F 21/51* (2013.01); *G06F 21/77* (2013.01); *G06F 21/123* (2013.01); *G06F 2221/2105* (2013.01); *G06F 2221/2129* (2013.01); *G06F 2221/2153* (2013.01); *G06F 21/556* (2013.01)
USPC ........ 726/17; 726/2; 726/26; 726/27; 726/19; 726/20; 713/193; 713/194; 710/301

(58) Field of Classification Search
USPC ..................... 713/193–194; 455/422.1, 435.2
See application file for complete search history.

(56) References Cited

U.S. PATENT DOCUMENTS

| 4,278,837 | A | 7/1981 | Best ........................... 178/22.09 |
|---|---|---|---|
| 5,191,608 | A | 3/1993 | Geronimi .......................... 380/4 |
| 6,000,030 | A | 12/1999 | Steinberg et al. ............. 713/200 |
| 6,005,942 | A | 12/1999 | Chan et al. ...................... 380/25 |
| 6,859,650 | B1* | 2/2005 | Ritter ............................ 455/406 |
| 2003/0055738 | A1* | 3/2003 | Alie ................................. 705/26 |
| 2004/0192306 | A1* | 9/2004 | Elkarat et al. .............. 455/435.2 |
| 2005/0184164 | A1 | 8/2005 | De Jong .......................... 235/492 |
| 2006/0037073 | A1* | 2/2006 | Juels et al. ..................... 726/17 |
| 2006/0064756 | A1 | 3/2006 | Ebert ............................... 726/26 |
| 2006/0156411 | A1* | 7/2006 | Saitoh ............................ 726/26 |
| 2006/0288407 | A1* | 12/2006 | Naslund et al. ................... 726/9 |

(Continued)

FOREIGN PATENT DOCUMENTS

EP 0932865 8/1999 ............... G06F 9/46

*Primary Examiner* — Venkat Perungavoor
*Assistant Examiner* — Amir Mehrmanesh
(74) *Attorney, Agent, or Firm* — Allen, Dyer, Doppelt, Milbrath & Gilchrist, P.A.

(57) ABSTRACT

A method for controlling the execution of an applet for an IC Card including a java card platform, includes a phase for downloading the applet inside the IC Card, a phase for executing the applet through the java card platform and a phase for storing an identification platform number inside a memory portion of the IC Card. The phase for executing the applet has a first step for detecting the identification platform number to perform the phase for executing the applet with or without restrictions, respectively if the identification platform number is not or is detected by the step for detecting. The applet is a java card applet or a SIM toolkit applet.

8 Claims, 1 Drawing Sheet

(56) References Cited

U.S. PATENT DOCUMENTS

2007/0155363 A1* 7/2007 Rager et al. .................. 455/410
2007/0294744 A1* 12/2007 Alessio et al. ................... 726/1
2008/0161050 A1* 7/2008 Shudark et al. .............. 455/558

* cited by examiner

METHOD FOR CONTROLLING THE EXECUTION OF AN APPLET FOR AN IC CARD

FIELD OF THE INVENTION

The present invention relates to a method for controlling the execution of an applet for an IC Card comprising a java card platform, the method including a phase for downloading the applet into the IC Card and a phase for executing the applet through the java card platform. The present invention also relates to an IC Card comprising a java card platform and an applet.

BACKGROUND OF THE INVENTION

An electronic device normally comprises a platform for the execution of programs. More particularly, the electronic device generally comprises a hardware platform including low level components, for example the circuitry, memory portions and processors, and a software platform including a set of service programs.

The service programs are provided for supporting the execution of user programs. More particularly, a java platform is a software platform including a compiler and an execution engine, also known as java virtual machine, which allows the execution of user programs, also indicated as java applets, since they are programmed in the java language.

A known feature of the java language is the so-called portability, that is to say the possibility to execute a same java applet on different hardware platforms, without modifying the code of the java applet.

In this way a java applet coded by a same manufacturer for both a first electronic device, comprising a first hardware platform, and a second electronic device, provided with a second hardware platform, may be executed substantially without modifications by both the electronic devices.

According to the above description, an IC Card is an electronic device usually provided with a specific java platform, also indicated java card platform, intended to support the execution of specific java applets, hereafter indicated as java card applets. Differently from the largest part of electronic devices, for an IC Card the portability conferred by the use of a java card platform may be a drawback for the following reasons.

Different manufacturers install their own java card platform on the hardware platform of the IC Card they produce. A first java card applet, coded by a first manufacturer for a first IC Card, is intended to be executed by a first java card platform of the first IC Card. Due to its portability, the first java card applet may be installed in a second IC Card, produced by a second manufacturer and executed by a second java card platform stored in the second IC Card.

More particularly, the first java card applet may be executed by different java card platforms, if such platforms provide the same java virtual machine. The first java card applet may require time and efforts by the first manufacturer to be developed, and it may thus be desirable to prevent its execution on the second java card platform. A simple download of the first java card applet in the second IC Card and its execution in the second java card platform could end in a discovering of the program code of the first java card applet.

Furthermore, the possibility to execute the first java card applet on the second java card platform may be a lack of security since the second manufacturer may try to discover security information related to the first IC Card. This is an issue since the IC Card should provide security. The problem described above occurs also with SIM toolkit applets that are applets provided with specific functions in order to communicate with a mobile handset.

SUMMARY OF THE INVENTION

The technical issue at the base of the present approach is to prevent the execution of a first applet, programmed to be executed by a first java card platform of a first IC Card, by a second java card platform, avoiding a detection of the program code of the first applet and avoiding a detection of security information related to the first IC Card.

Another aim of the present approach is to control the portability of an applet toward other java card platforms, thus overcoming the limitations and drawbacks that currently affects their use.

An object is to provide a method for controlling the execution of an applet of the type described above, the method blocking or restricting the execution of the applet in non authorized java card platforms. A further object is to provide a specific IC Card including an applet that can be executed through the specific java card platform of the specific IC Card.

The approach is to provide a method for controlling the execution of an applet of the type described above able to detect the java card platform of the IC Card wherein the applet is downloaded, blocking or restricting the execution of the applet if the java card platform detected is not recognize.

According to this approach, a method is for controlling the execution of an applet for an IC Card comprising a java card platform, including a phase for downloading the applet into the IC Card and a phase for executing the applet through the java card platform. An identification platform number is provided inside a memory portion of the IC Card the identification platform number is detected before starting the phase for executing the applet in order to perform in a normal or restricted mode, if the identification platform number is or is not identified, respectively. Advantageously, according to the method, a manufacturer of IC Cards may prevent the execution of the applet by an unauthorized third party, not only protecting the program code of the applet but also enforcing the security of the first IC Card.

The applet may also avoid loss of business due to illegal downloads and executions of applets on compatible java card platforms, controlling the applets portability. More particularly, the applet may be a java card applet or a SIM toolkit applet intended to be used with a mobile handset. Other features and advantages will be apparent from the following description of an embodiment, given by way of non-limitative example with reference to the accompanying drawings.

DETAILED DESCRIPTION OF THE PREFERRED EMBODIMENTS

With reference to the annexed drawing, schematically represented with numeral reference 1 is a first IC Card, produced by a first manufacturer, including a first java card platform 2 with a java virtual machine. The first java card platform 2 supports the execution of an applet 3 produced by the first manufacturer and downloaded into the first IC Card 1.

Without limiting the scope of the present approach, the applet 3 may be a java card applet 3 or a SIM toolkit applet 3 that is a specific applet provided with functions to communicate with a mobile handset. In the following description the term applet may be read as java card applet or SIM toolkit applet.

An identification platform number Id1 stored in a memory portion 4 of the first IC Card 1, is associated to the first java card platform 2. The identification platform number Id1 is protected, since the manufacturer producing the IC Card 1 is aware of the location of the memory portion 4.

An execution of the first applet 3 comprises a detection phase of the Id1 associated to the first java card platform 2. More particularly, when the first applet 3 is activated, the first step of execution comprises the detection of the identification platform number Id1. In fact, since the first manufacturer produces both the first IC Card 1 and the applet 3, applet 3 may be programmed to access the identification platform number Id1 inside the memory portion 4.

If the detection phase confirms that the Id1 corresponds to an expected identification platform number, the execution of the first applet 3 is continued. On the contrary, if the Id1 is an unexpected identification platform number, the execution of the first applet 3 is stopped. In this case the first applet 3 detects that it has been downloaded in a second java card platform, belonging to a second IC Card 2.

In other words, the method suggests detecting the identification platform number Id1 before starting the phase for executing the applet, in order to perform in a normal or restricted mode the subsequent phase for executing the applet if the identification platform number is or is not identified, respectively.

Figure 1:
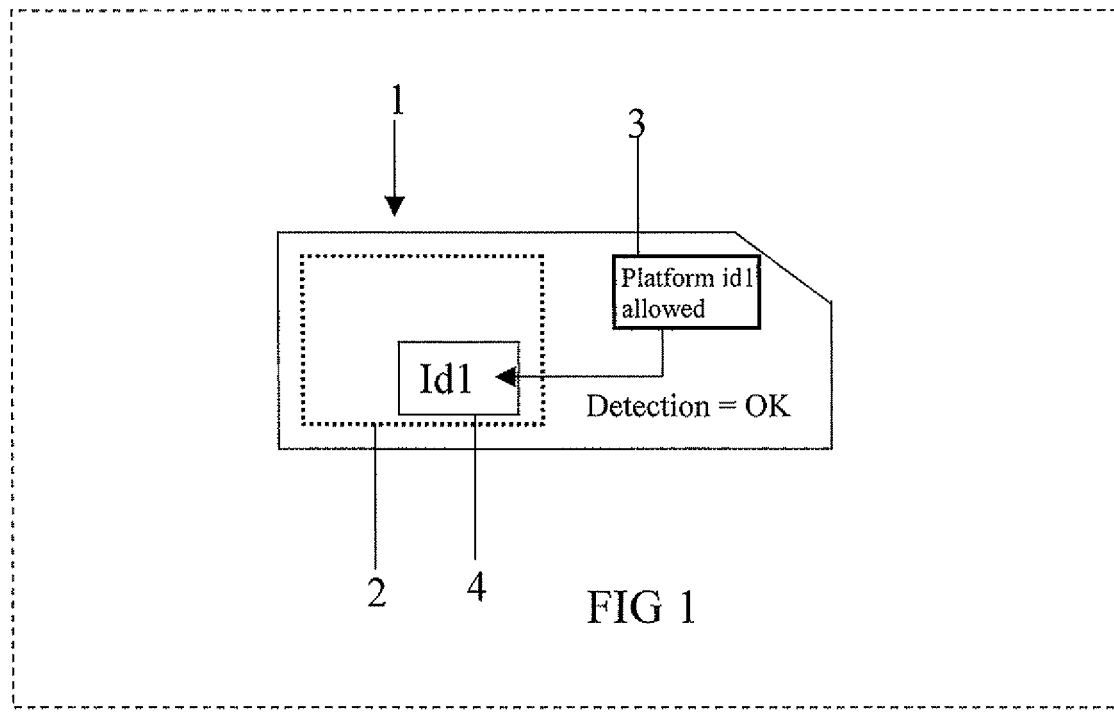
FIG. 1 schematically shows an execution of an applet detecting a platform id for a first IC Card, comprising a first java card platform, according to the present invention.
Figure 2:
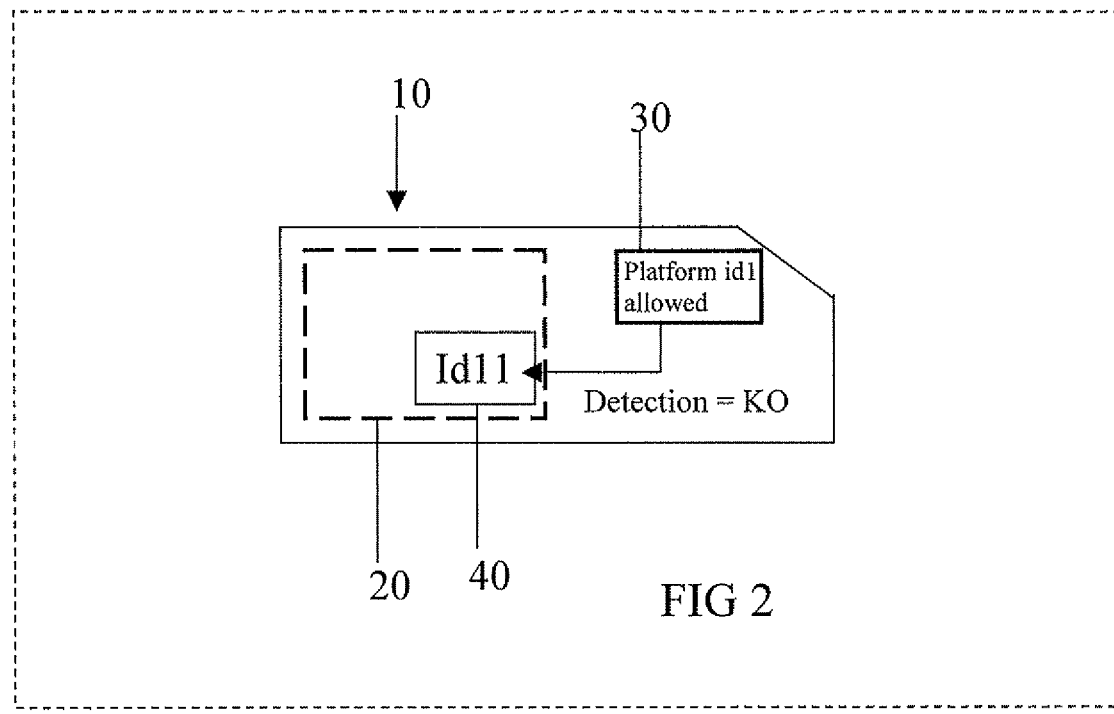
FIG. 2 schematically shows the execution of the applet of FIG. 1 for the detection of a platform id for a second IC Card.

With reference to FIG. 2, schematically represented with numeral reference 10 is a second IC Card, produced by a second manufacturer, including a second java card platform 20 with a java virtual machine. The java virtual machine is supposed to be compatible with the java virtual machine included in the first java card platform 2 of the first IC Card 1. The second java card platform 2 supports the execution of applets produced by other manufacturers and downloaded into the second IC Card 10.

However, the second IC Card 10 does not include the identification platform number Id1 and, furthermore, such IC Card 10 may not include an identification number stored in the same memory portion 4 of the first IC Card 1.

When the first applet 3 is downloaded and activated inside the second IC Card 10, its first step of execution comprises the detection of the identification platform number Id1. As stated above, the second IC Card 10 does not store the identification platform number Id1; in fact it may be associated with an identification platform number Id11, for example stored in a memory portion 40 that is not accessible to the first applet 3.

The identification platform number Id11 and the associated memory portion 40 is known to a second manufacturer producing the second IC Card 10. The execution of the first applet 3 is stopped because the Id11 is not the expected identification platform number Id1.

Advantageously, the first manufacturer may protect his IC Card, preventing the execution of the first applet 3 by an unauthorized third party, not only protecting the source code of the applet but also enforcing the security of the first IC Card 1. The first applet 3 may also avoid the loss of business due to illegal downloads and executions of applets on compatible java card platform, limiting the applets portability.

In some cases, the possibility to allow an execution of the first applet 3 into the second IC Card 10 produced by the second manufacturer may be helpful.

For example, the second manufacturer of a customer provided with the second IC Card may be authorized to use the first applet 3, downloading and executing it for demonstrative purposes on the second java card platform 20. To this aim, an aspect provides a method to allow an execution of the applet 3 by the second IC Card 10 for a limited period or for a limited number of executions.

More particularly, the IC Card 10 is downloaded inside the second IC Card 10 to be executed. During the download, one or more parameters are sent to the applet 3. On the base of such parameters the execution of the applet 3 may not enter the detection phase, in order to avoid the block due to the unrecognized second java card 20; the detection phase is skipped and the execution of the first applet 3 is allowed by the second IC Card 20.

More particularly, the execution of the first applet 3 inside the second IC Card 20 may be allowed, depending on the parameters, for a limited number of time or with limited functionality. If the first applet 3 is downloaded into the second IC Card 10 with wrong parameters, it may be blocked.

In order to facilitate execution of the first applet 3 if blocked, the first applet 3 is downloaded another time into the second IC Card 10 with the correct parameters.

Advantageously, the first manufacturer may not only prevent the execution of the first applet 3 inside IC Card 10 produced by unauthorized manufacturer, but also allow an execution of the first applet 3 by an authorized third party provided with the IC Card 10.

Advantageously, the execution of the first applet 3 by an authorized third party may be regulated, limited to a specific number of execution for demonstrative purpose, or limited in functionality.

Hereafter the main phases according to a method embodiment are briefly summarized. The method comprises a phase for downloading the applet 3 inside the IC Card 1, a phase for executing the applet 3 through the java card platform 2 included in the IC Card 1, and a phase for storing an identification platform number Id1 inside a memory portion 4 of the IC Card 1.

The phase for executing the applet 3 comprises a first step for detecting the identification platform number Id1 in order to execute the phase for executing the applet 3 in a normal or restricted mode, respectively if the identification platform number Id1 is or is not identified by the first step for detecting.

The phase for storing stores the identification platform number Id1 in a secret memory portion 4 specified by a manufacturer of the IC Card 1. More particularly, the applet 3 is programmed in order to allow the first step of detecting to access the secret memory portion 4.

The phase for executing the applet 3 with restriction comprises a block of the applet 3. In this case, all the services provided by the applet 3 are stopped. The phase for downloading comprises a specification of parameters for the phase for executing with restriction, if the identification platform number Id1 is not detected. The parameters comprise a specification of a number of times the phase of execution may be activated and/or a restricted subset of services that the applet 3 can provide.

An aspect relates to an IC Card 1 comprising a java card platform 2 and a applet 3. The java card platform is downloaded in a memory portion of the IC Card 1 and includes a java virtual machine for the execution of the applet (3).

The IC Card 1 comprises an identification platform number Id1 that is that is stored in a secret memory portion 4 of the IC Card 1. Such identification platform number Id1 and the memory portion 4 wherein it is stored are known to the manufacturer of the IC Card and represent a unique identification number for the IC Card 1.

The applet 3 comprises means or circuitry for detecting the identification platform number Id1. More particularly, the program code of the applet 3 is programmed by the same manufacturer that produces the IC Card, so that the means or circuitry for detecting may identify the identification platform number Id1.

The applet 3 comprises a portion of code, indicated as normal code, intended to be executed if the detecting means or circuitry identifies the identification platform number Id1. The applet 3 also comprises a restricted portion of code intended to be executed if the detecting means do not identify the identification platform number Id1. The IC Card 1 also comprises one or more parameters for controlling an execution of the restricted portion of code, when the identification platform number Id1 is not identified. An execution of the restricted portion of code of the applet 3 is associated to the parameters. Such parameter for example block an execution of the applet 3 or limit a number of execution of the applet 3 or limit the services provided by the normal code of the applet 3.

That which is claimed:

1. A method for controlling execution of a first applet in a second IC Card comprising a second java card platform, with the first applet initially intended for execution on a first IC Card comprising a first java card platform, the method comprising:

downloading the first applet into the second IC Card, and at least one parameter being sent to the first applet during the download;

detecting an identification platform number that identifies the first java card platform, with the first java card platform being in a memory portion of the second IC Card; and executing the first applet, through the second java card platform, when the at least one parameter is correct, and when the at least one parameter is not correct, then blocking execution of the first applet, with the at least one parameter specifying a restricted subset of services of the first applet to be provided.

2. A method according to claim 1 wherein the at least one parameter includes a number of times the first applet may be executed.

3. A method according to claim 1 wherein the first and second applet each comprises a java card applet.

4. A method according to claim 1 wherein the first and second applet each comprises a SIM toolkit applet.

5. An IC Card comprising:

an IC card substrate;

a memory on the IC card substrate to store, a first applet initially intended for execution on a different IC Card comprising a first java card platform, a second java card platform and a second applet, and at least one parameter associated with the first applet and an identification number that identifies the first java card platform; and a processor on the IC card substrate;

said processor to cooperate with the memory to execute the first applet when the at least one parameter is correct, and when the at least one parameter is not correct, then block execution of the first applet, with the at least one parameter specifying a restricted subset of services of the first applet to be provided.

6. An IC Card according to claim 5 wherein the first and second applet each comprises a java card applet.

7. An IC Card according to claim 5 wherein the first and second applet each comprises a SIM toolkit applet.

8. An IC according to claim 5 wherein the at least one parameter includes a number of times the first applet may be executed.

* * * * *